Feb. 20, 1951 L. PEASE 2,542,351
REVERSIBLE SPEED CHANGING MECHANISM
Filed Aug. 15, 1946 4 Sheets-Sheet 1
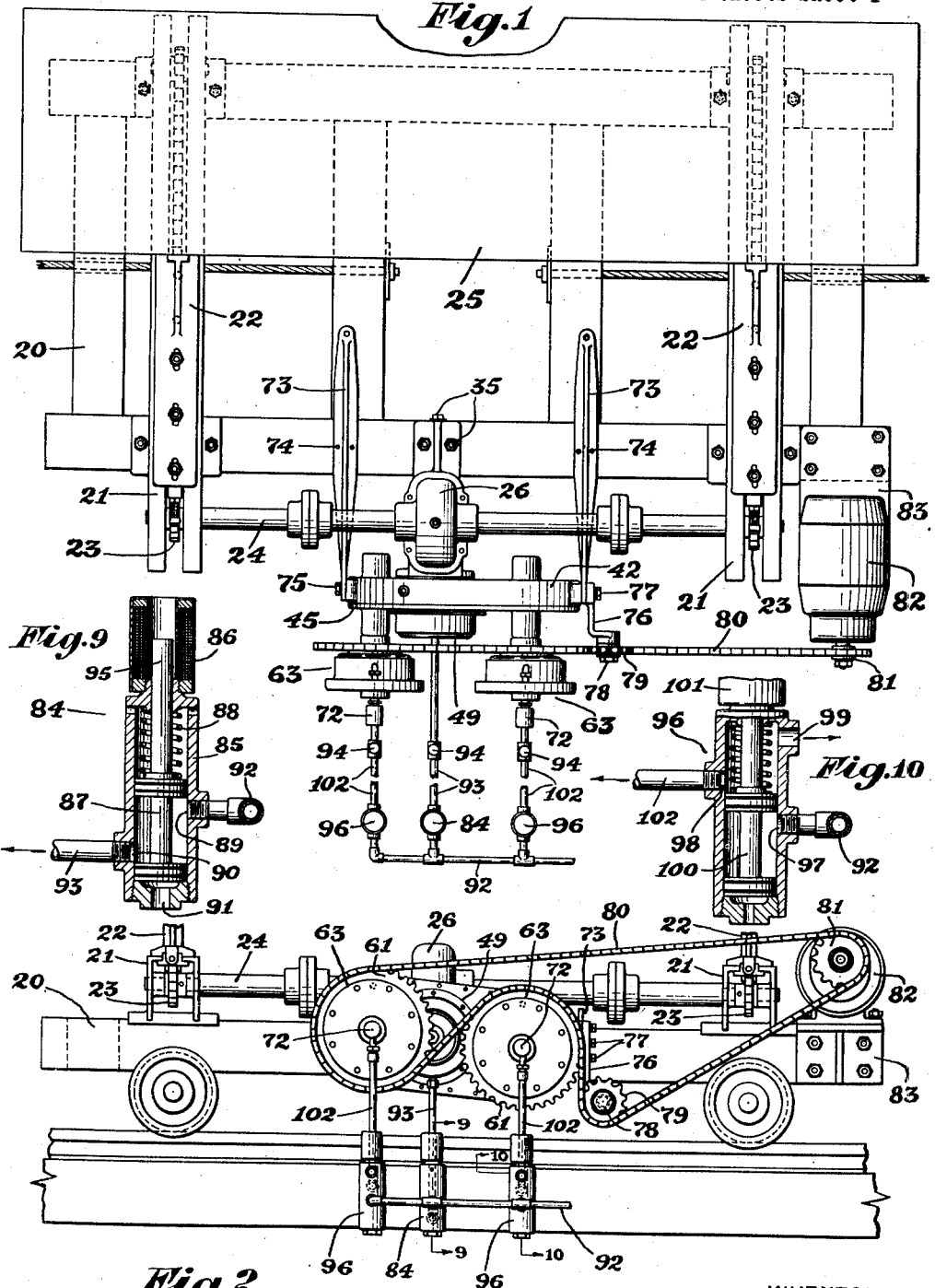
INVENTOR
Lionel Pease
BY
James E. Sproll
ATTORNEY Feb. 20, 1951 L. PEASE 2,542,351
REVERSIBLE SPEED CHANGING MECHANISM
Filed Aug. 15, 1946 4 Sheets-Sheet 2
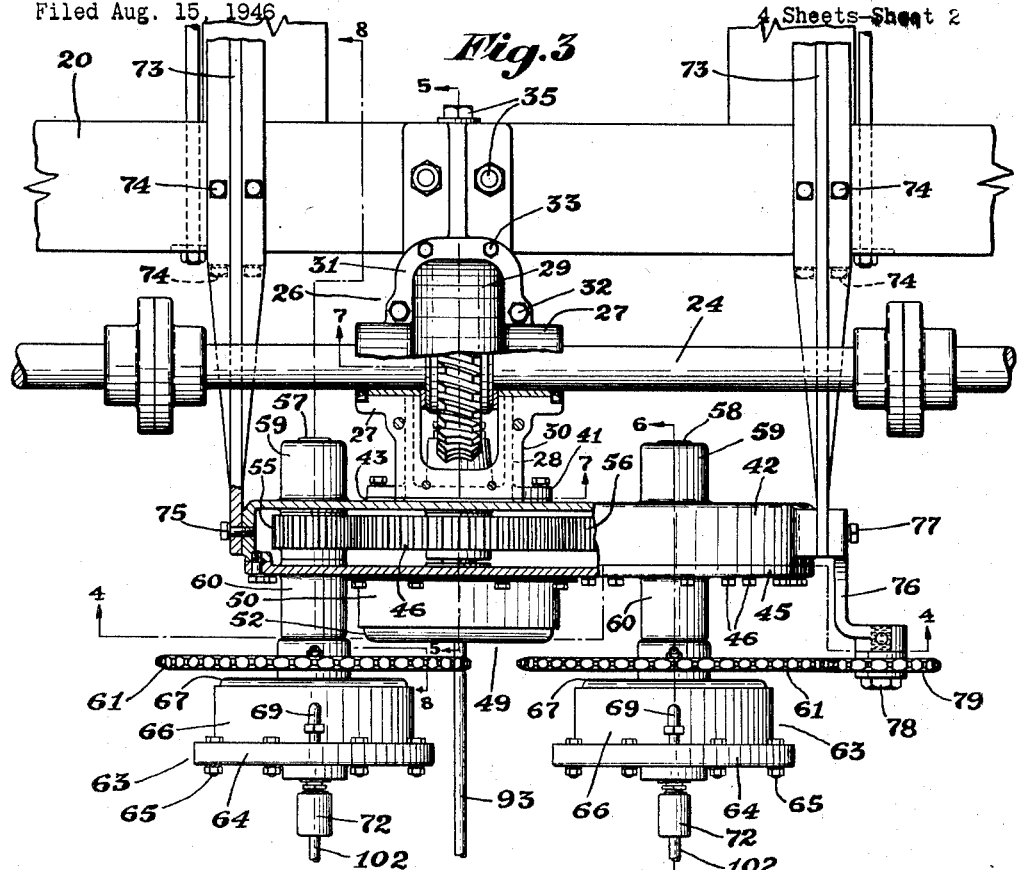
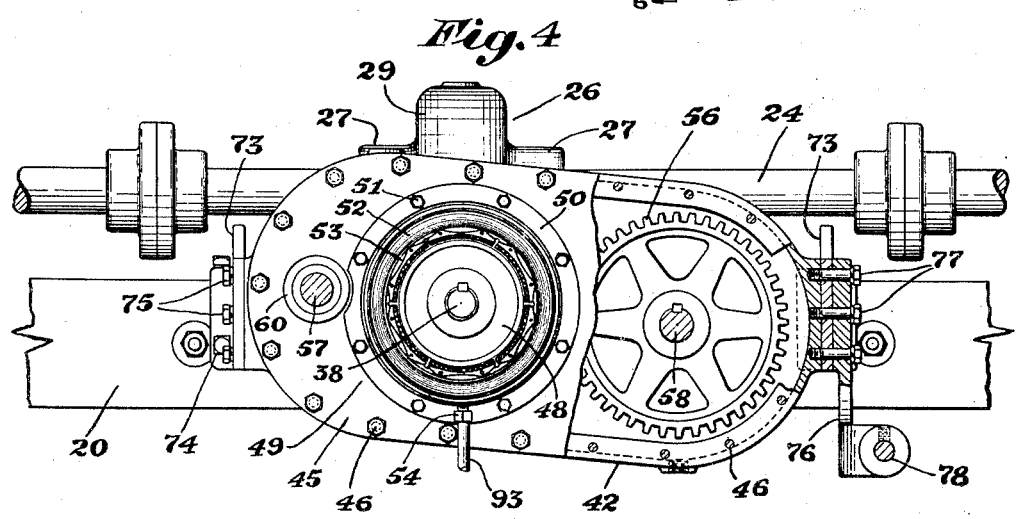
INVENTOR
Lionel Pease
BY James E. Sproll
ATTORNEY.

Feb. 20, 1951 L. PEASE 2,542,351
REVERSIBLE SPEED CHANGING MECHANISM
Filed Aug. 15, 1946 4 Sheets-Sheet 3
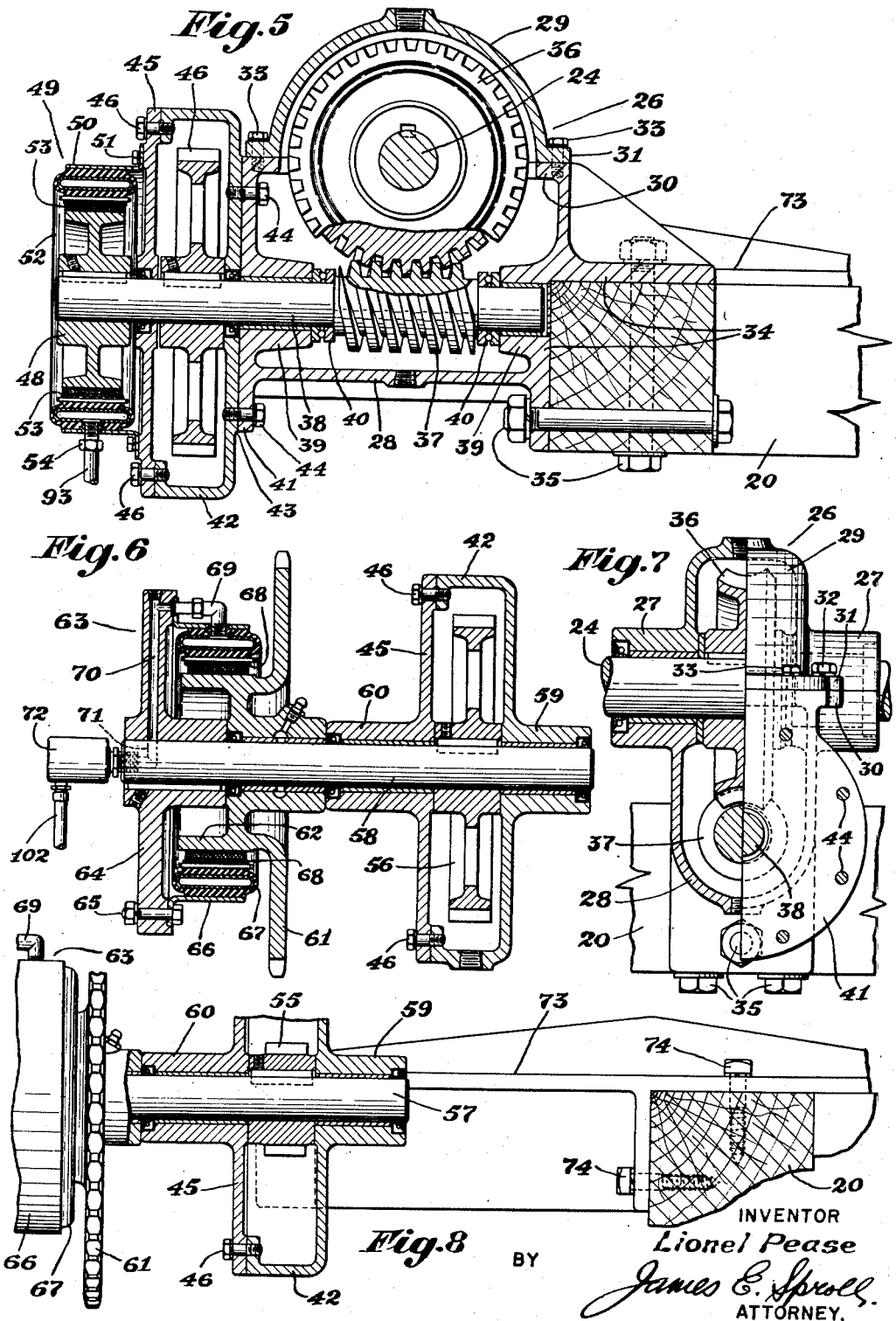
INVENTOR
Lionel Pease
BY James E. Sproll
ATTORNEY.

Feb. 20, 1951      L. PEASE      2,542,351
REVERSIBLE SPEED CHANGING MECHANISM
Filed Aug. 15, 1946      4 Sheets-Sheet 4
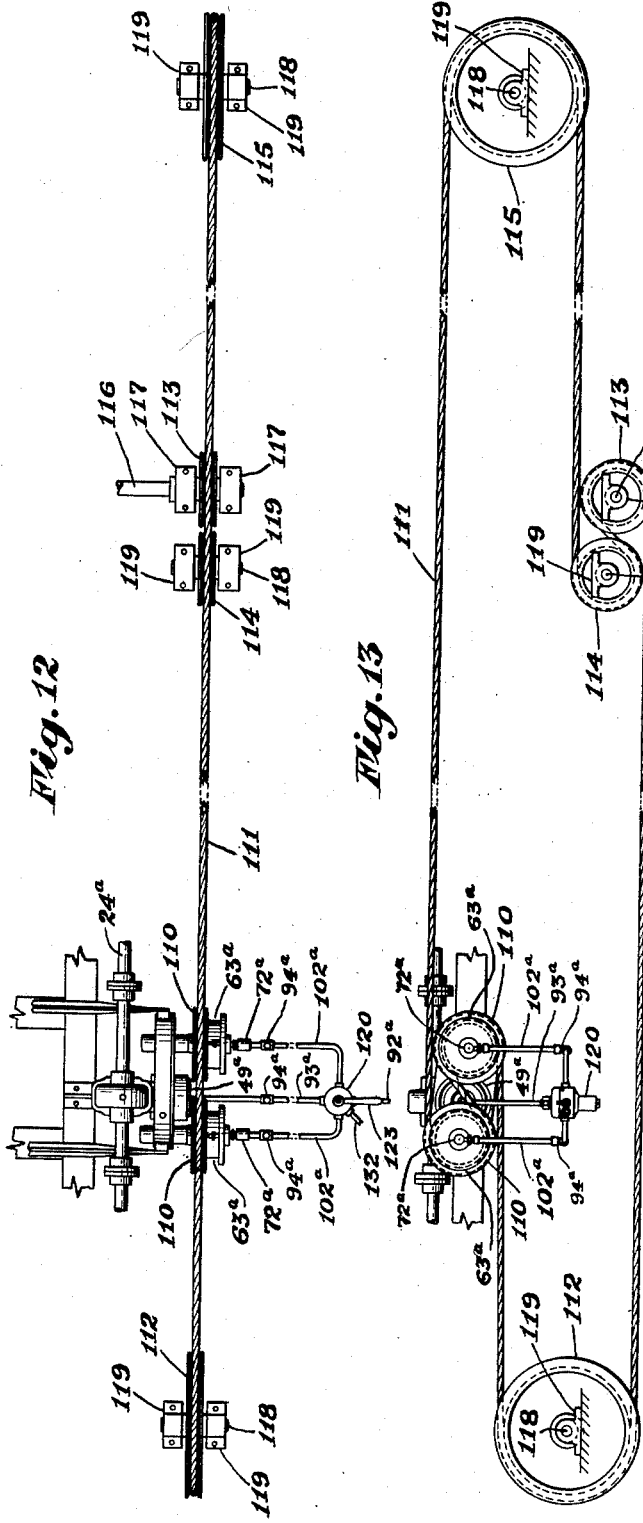
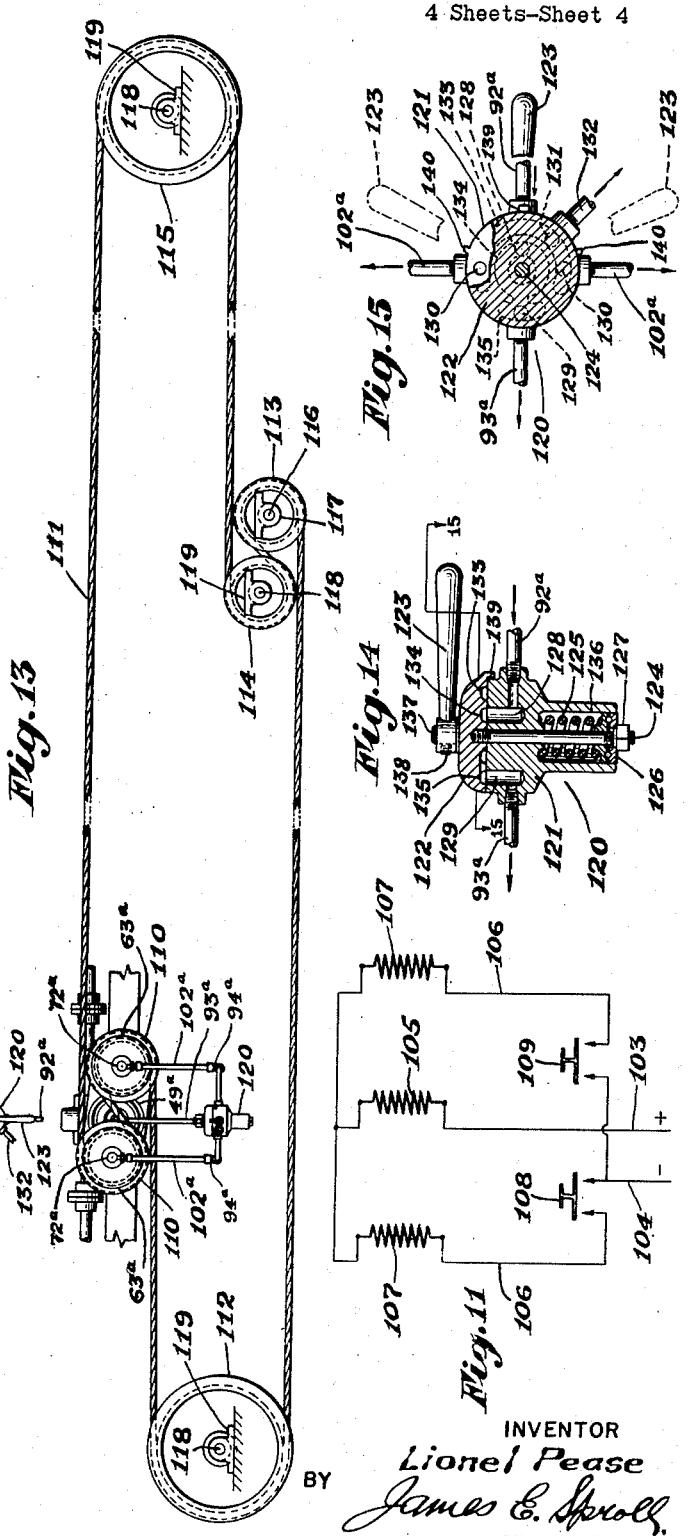
INVENTOR
Lionel Pease
BY James E. Sproll
ATTORNEY.

Patented Feb. 20, 1951

2,542,351

UNITED STATES PATENT OFFICE 2,542,351

REVERSIBLE SPEED-CHANGING MECHANISM

Lionel Pease, Seattle, Wash., assignor to Frank H. Draper, Seattle, Wash.

Application August 15, 1946, Serial No. 690,670

3 Claims. (Cl. 192—4)

The primary aim of this invention is the provision of a reversible speed-changing mechanism, the driven or power-output shaft of which is instantly reversible from rotation in one direction at one rate of speed to rotation in the opposite direction at another rate of speed, or is instantly stopped and positively locked against rotation.

Another primary aim and important object of the invention is to provide a reversible speed-changing mechanism especially designed and adapted for incorporation and use with a sawmill carriage set works: for effecting power actuation of the same and in consequence successive advancement of the log to the saw line during cutting operations; for positively preventing overtravel or over-running of the set works regardless of the weight of the load; for stopping the set works in any intermediate position of travel and instantly reversing same to rectify errors in setting; and for positively locking the set works in any predetermined advanced or retracted position independently of the torque transmitting members of the mechanism.

A further object of the invention is the provision of a reversible speed-changing mechanism capable of withstanding excessive shocks and stresses incident to high speed operation and to handling heavy loads, such as logs or large timbers.

A still further object is the provision of a reversible speed-changing mechanism adaptable for use with classes of machinery, wherein it is desirable to have a relatively slow motion in one direction followed by a rapid return movement in the opposite direction, this in order to reduce the idle or non-productive periods of the same.

A still further object is the provision of a reversible speed-changing mechanism adaptable for either pneumatic or hydraulic actuation, and for control from either a local or remote station, which latter feature is especially advantageous and beneficial in sawmill operations; inasmuch as it enables the operator to observe the work from a safe distance; cuts down accident hazards and materially reduces operational costs.

With the foregoing in view, the invention essentially resides, and is more particularly concerned in the provision of a reversible speed-changing mechanism, which in its preferred embodiment is characterized by the employment of freely rotating dual driving shafts having fluid-distensible torque transmitting or clutch structures rigidly secured thereto for rotation therewith and adapted to individually or selectively connect said shafts with a suitable source of power; an intermediate or brake shaft operatively connected to said driving shafts for reverse rotation thereby at different rates of speed; a non-rotatable fluid-distensible brake structure adaptable for independently and positively locking the intermediate shaft against rotation during idle periods of said torque transmitting structures; a driven or power-output shaft connected with and reversely rotated at different rates of speed by said intermediate shaft; means for conducting pressure fluid to the torque transmitting and brake structures to distend same; and valve means interposed at any desired point or suitable location in the pressure fluid conducting means, adaptable to maintain the brake structure distended during deflated periods of the torque transmitting structures and to be deflated simultaneously with the distention of either of said last mentioned structures and conversely to be distended simultaneously with the deflation of the distended torque transmitting structure, all of which are to be correlated in the broad aim of enhancing the efficiency of the present mechanism for the uses and purposes for which it is primarily designed.

The above, and additional objects which will hereinafter be more specifically treated are attained by such means as are shown in the accompanying drawings, described in the following specification, and then more clearly pointed out in the claims, which are appended hereto and form part of this application.

With reference to the drawings, in which there are illustrated two embodiments of the invention, and throughout the several views of which like characters of reference designate similar parts:

Figure 1 is a plan view of a reversible speed-changing mechanism comprehended by the present invention, and as it would appear when associated with and operatively connected to a sawmill carriage set works;

Figure 2 is a side elevation of the same;

Figure 3 is an enlarged plan view of the reversible speed-changing mechanism with certain parts thereof broken away and shown in section and certain other parts omitted for clarity of illustration;

Figure 4 is a longitudinal vertical section taken on the line 4—4 of Figure 3;

Figures 5 and 6 are transverse vertical sections taken on the lines 5—5 and 6—6, respectively, of Figure 3;

Figure 7 is a fragmentary longitudinal vertical section taken on the line 7—7 of Figure 3;

Figure 8 is a fragmentary transverse vertical section taken on the line 8—8 of Figure 3 with certain parts shown in elevation;

Figure 9 is a vertical medial section of the multi-port solenoid actuated brake control valve taken on the line 9—9 of Figure 2;

Figure 10 is a similar section of the multi-port solenoid actuated clutch control valve taken on the line 10—10 of Figure 2;

Figure 11 is a diagrammatic view of the electrical circuit of the solenoid actuated brake and clutch control valves;

Figure 12 is a plan view on a reduced scale of the reversible speedchanging mechanism employing an alternative type of power drive and valve control.

Figure 13 is a side elevation of the same;

Figure 14 is a vertical medial section of the alternative type of manually operable brake and clutch control valve; and Figure 15 is a horizontal section of the same taken on the line 15—15 of Figure 14, with certain parts broken away.

In the present disclosure, I have elected to show and describe the reversible speed-changing mechanism of the invention as operatively adapted and designed to function as a sawmill power set works, but it is to be here understood that this is merely for purposes of illustration, inasmuch as the present reversible speed-changing mechanism has many adaptations and varied applications.

In the drawings, the numeral 20 designates a sawmill carriage; 21, the carriage headblocks; 22, the carriage knees or movable uprights reciprocatively mounted upon the headblocks; 23, sprocket chain gearing operatively and medially disposed within the headblocks in co-extensive relation thereto and connected to the knees for effecting advancement and retraction of same; 24, a reversely rotatable sectional set shaft having its terminal portions journalled in corresponding ends of the carriage headblocks and operatively connected thereat to the sprocket chain gearing thereof for effecting reciprocative movement of the latter; and, 25, a log or other piece of timber resting upon the headblocks 21, and adapted to be progressively advanced to the saw line by the knees 22 following each cut from the log.

In the beginning the detailed description of the reversible speed-changing mechanism of the present invention, it should first be stated that the aforementioned reversely rotatable sectional set shaft 24 forms and constitutes the longitudinally disposed driven or power-output shaft of the present mechanism, accordingly, the center section of said shaft is journaled, intermediate its length, within a sectional worm gear casing 26, provided for such purpose with axially spaced and bushed split bosses 27, said casing being removably mounted, in a manner hereinafter described, upon the adjacent side member of the sawmill carriage 20, substantially midway the length of said member to extend laterally therefrom. The casing 26 essentially consists of a rectangularly shaped lower or main body section 28 and a semi-circular upper or cover section 29, each having half of the aforementioned split bosses 27 integrally formed thereon. The lower section 28 is provided with a flange 30 and the upper section 29 is similarly provided with a flange 31, which flanges are secured in abutting and sealed relation, adjacent the split bosses 27, by cap screws 32, and at their outer ends, by slightly smaller cap screws 33, all as more clearly shown in Figs. 3, 5 and 7. The inner end of the lower or main body section 28 of the casing 26 is angularly formed, as at 34, to snugly fit upon the outer and upper faces of the sawmill carriage side member above mentioned, and, in the present instance, said body section is detachably secured to such member, as by horizontally and vertically disposed bolts 35.

Housed within the casing 26 and keyed or otherwise rigidly secured to the center section of the driven shaft 24 is a worm wheel 36 normally meshing, upon its underside, with a worm 37 integrally formed upon, or rigidly secured in any suitable manner to, the inner end portion of a laterally disposed brake or intermediate shaft 38 journalled, adjacent the ends of the worm 37, within axially aligned bushed bosses 29 carried by the interior walls of the lower or body section 28. Interposed between the ends of the worm 37 and the bosses 39 are antifriction or thrust bearings 40. For a purpose about to be described, the outer end portion of the brake shaft 38 extends from the outer end of the lower or body section 28, and such outer end of said section is provided with a substantially circular flange 41 integrally formed thereon in concentric relation to the axis of rotation of said brake shaft.

The reference numeral 42 designates a longitudinally disposed spur gear casing, of elongated and relatively shallow formation, said casing being provided with semi-circular ends and having a circular mounting pad 43 integrally formed upon its back or rear face nearer one end of the casing than the other and in symmetric relation to the major axis thereof, see Figs. 1, 3 and 5. The spur gear casing 42 is adapted to be mounted upon the body section 28, with the pad 43 of such casing in abutting and concentric relation with the flange 41 of said section, and when so mounted is detachably secured to the latter by cap screws 44. A casing cover 45 similar in contour to the casing 42 is removably secured to the forward face of said casing by cap screws 46. The outer end portion of the brake shaft 38 extends through both the casing 42 and cover 45, with its terminal portion projecting from the latter for a purpose shortly to be described. Housed within the casing 42 and keyed or otherwise rigidly secured to the brake shaft 38 is a spur gear 46, and similarly secured to the terminal portion of the brake shaft 38 above mentioned is a brake or locking wheel 48 adapted to be frictionally engaged by a non-rotatable fluid-distensible cushioning brake or locking structure 49 of the constricting type, which is well known in the industrial art, hence, no claim is made herein for any novelty in such structure, per se; however, novelty is claimed herein for the combination of such structure, or its mechanical equivalent, with the other elements or features of the mechanism herein shown and described.

In view of the fact that the construction of the brake or locking structure 49 is familiar to those skilled in the art, it is thought a brief description will suffice for a ready understanding of the present application of the same. The numeral 50 designates an annular flanged member adapted to be detachably secured, as by cap screws 51, to the outer face of the casing cover 45, in a common plane with and in concentric spaced relation to the brake wheel 48. Rigidly secured, in any suitable manner, to the inner wall surface of the member 50 is an annular fluid-distensible member 52, which latter, upon its constrictable wall, is provided with a series of brake or friction shoes 53 for frictionally engaging the periphery of the brake wheel 48 upon distention of the member 52. Fluid pressure is supplied to the distensible member 52 through a fitting 54, which latter is connected, in a manner hereinafter more fully described, to a suitable source of fluid pressure.

Housed within the casing 42, and meshing with the brake shaft spur gear 46, in diametrically opposed relation, is a spur pinion 55 and a spur gear 56, respectively keyed, or otherwise rigidly secured to the inner end portions of driving or power transmission shafts 57 and 58, which shafts are disposed in spaced parallel relation to the brake shaft 38 and have their inner end portions above mentioned journalled in axially aligned, bushed bosses 59 and 60, respectively, said bosses 59 being integrally formed upon the outer surface of the back wall of the casing 42 to extend rearwardly therefrom, while the bosses 60 are similarly formed upon the outer surface of the cover 45 to extend forwardly therefrom, it being here noted, in this connection, that the bosses 59 and 60 of the shaft 58 are located in concentric relation to their semi-circular end of the casing 42, while, the bosses of the shaft 57 are not. The outer end portions of the driving shafts 57 and 58 extend from the bosses 60 and revolubly mounted upon said shafts, in contiguous relation to said bosses, are bushed driving sprocket wheels 61 provided with clutch or friction drums 62, which may be integrally formed thereon, or rigidly secured thereto in any suitable manner, said drums being adapted for frictional engagement with fluid-distensible torque transmitting rotary structures or clutches 63, of the constricting type, which are also well known in the industrial art and hence require only a brief description of their present application. The rotary clutches 63 comprise centrally bossed and disk-shaped adapters 64, which are rigidly secured, as by keying, to the outer terminals of their shafts 57 and 58, respectively, for rotation therewith. Fixedly secured, as by bolts 65, to the inner faces of the adapters 64 are inwardly directed annular flanged members 66 adapted to be normally disposed in a common plane with and concentric spaced relation to the clutch drums 62. Rigidly secured, in any suitable manner, to the inner wall surfaces of the annular flanged members 66 are annular fluid-distensible members 67, which latter upon their constrictable wall surfaces are each provided with a series of clutching or friction shoes 68 for frictionally engaging the peripheries of the clutch drums 62 upon distention of the members 67. Fluid pressure is supplied to the distensible members 67 through L-shaped fittings 69, having communication with radially disposed passageways or ducts 70 formed within the adapters 64, which communicate at their inner ends with L-shaped ducts 71 formed within the outer terminals of the shafts 57 and 58, said last mentioned ducts 71 having rotorseals 72 threadedly mounted within their outer ends. The rotorseals 72 are also well known in the industrial art and are fabricated and furnished by the manufacturer of the fluid-distensible torque transmitting rotary structures 63. Briefly, the rotorseal 72 consists of a ground and lapped spindle rotating in a sealed double row ball bearing and is positively sealed within its correlated casing by a non-metallic bushing. The rotorseals 72 are connected to a suitable source of fluid pressure in a manner hereinafter more fully described.

To positively brace the spur gear casing 42 against distortion and to effectively maintain the same in its normal operative position, said casing, at its semi-circular ends, is provided with spaced parallel and laterally disposed webbed brackets 73 having their inner end portions fixedly secured to the sawmill carriage 20 by lag screws 74, while, one of said brackets at its outer end is detachably secured to its end of the casing 42 by cap screws 75 and the other of said brackets at its outer end is, jointly with a depending angular bracket 76, detachably secured to its end of the casing 42 by cap screws 77. Threadedly secured within the outer angular terminal portion of the depending bracket 76 is a stud 78 upon which is revolubly mounted a sprocket pinion idler 79.

The sprocket wheels 61 are adapted to be rotated in opposite directions at the same speed by an endless sprocket chain 80, which, for this purpose, passes over and under one sprocket wheel, then over the other sprocket wheel and then under the sprocket pinion idler 79, substantially in the manner shown in Fig. 2. The endless sprocket chain 80 is driven by a sprocket pinion 81 of the gear reduction motor 82, which motor is mounted upon a laterally projecting motor supporting bracket 83 fixedly secured to the sawmill carriage 20.

For effecting actuation of the non-rotatable fluid-distensible cushioning brake or locking structure 49, a solenoid piston control valve 84 is provided therefor, said valve, comprising a cylindrical body 85; a solenoid 86; a pressure-balanced and spring-pressed valve piston 87, and a helical compression spring 88. The valve body 85 is provided, substantially midway its height, with a fluid pressure inlet port 89, and in its lower portion with a fluid pressure outlet port 90, and a fluid pressure exhaust port 91. The inlet port 89 is connected by a fluid pressure supply pipe 92 to a suitable source of fluid pressure, not shown, while the outlet port 90 is connected by a pipe 93 to the fitting 54 of the brake structure 49, said pipe 93 having a quick-opening automatic exhaust valve 94 interposed therein adjacent said brake structure, whereby deflation of the latter is rapidly effected. The solenoid 86 is operatively mounted upon the upper end of the valve body 85 and extends therefrom in axial prolongation thereto. The pressure-balanced spring-pressed valve piston 87 is reciprocably disposed within the valve body with the upper end of its piston rod 95 normally extending within the bore of the solenoid 86. When the valve piston 87 is in the lowered or spring depressed position, shown in Fig. 9, communication between the fluid pressure inlet and outlet ports 89 and 90 is established and maintained until the solenoid 86 is energised to raise the valve piston 87 and thus establish communication between the fluid pressure outlet and exhaust ports 90 and 91, and upon de-energising of the solenoid 86 the valve piston 87 is returned to its lowered position by the helical compression spring 88, whereupon communication between the inlet and outlet ports 89 and 90 is again established.

To effect selective actuation of the fluid-distensible torque transmitting rotary structures or clutches 63, said structures are each provided with a solenoid piston control valve 96, which is substantially similar in construction and operation to the hereinbefore described solenoid valve 84, said valve 96 having its fluid pressure inlet port 97 located in the same position on its valve body as the corresponding port of the valve 84, but, differing from the latter by having its fluid pressure outlet and exhaust ports 98 and 99, respectively, located in the upper portion of its valve body. The pressure-balanced and spring-pressed valve piston 100 of the valve 96, when in the lowered or spring depressed position, shown in Fig. 10, cuts off communication between the fluid pressure inlet and outlet ports 97 and 98, but functions to establish and maintain communication between the outlet and exhaust ports 98 and 99, until the solenoid 101 is energised to raise the valve piston 100 and thereby establish communication between the ports 97 and 98.

The inlet ports 97 of the valves 96 are connected to the fluid pressure supply pipe 92, while the outlet ports 98 of said valves are connected by pipes 102 to the rotorseal 72 of the torque transmitting structures 63, said pipes 102, each having a quick-opening automatic exhaust valve 94 interposed therein adjacent said structures 63, whereby deflation of the latter is rapidly effected.

In the electrical diagram of the solenoid coil circuit illustrated in Fig. 11, the numerals 103 and 104, respectively, designates the positive and negative sides of such circuit, which are connected at a common end to a source of electrical energy, not shown. In series with the positive side 103 of said circuit is the coil 105 of the brake solenoid valve 84, and branching from said positive side 103, at the negative end of the coil 105, are leads 106 having the coils 107 of the clutch solenoid valves 96 in series therewith, said leads at their outer ends being connected to corresponding poles or points of push button, two-point make, switches 108 and 109, respectively, the opposite poles or points of which are connected to the negative side 104 of the solenoid coil circuit. From the foregoing description, and by referring to Fig. 11, it will be noted and observed that the brake valve solenoid coil 105 is adapted to be energized each time either of the clutch valve solenoid coils 107 are energised, this for the purpose of effecting deflation of the brake structure 49 simultaneously with the distention of either of the clutch structures 63 or conversely distention of the brake structure simultaneously with the deflation of the distended clutch structure, as will hereinafter be made more apparent in the operational description of the present mechanism. In the two-way electrical control, above described, the push button switch 108 functions as the brake releasing and clutch engaging switch for low operational speed of the mechanism, while, the push button switch 109 functions as the brake releasing and clutch engaging switch for reversed rotation and relatively higher operational speed of the same. The push button switches 108 and 109 also form and constitute a brake and clutch control station, which may be located in close proximity to the mechanism, or remotely therefrom, as desired and found expedient.

The operation of the reversible speed-changing mechanism and its associated sawmill carriage set works is as follows: with the driving sprocket wheels 61 rotating in opposite directions and at the same speed, and with the pistons of the solenoid valves 84 and 96 in the lowered position shown in Figs. 9 and 10, the brake shaft 38 is locked against rotation, by reason of the fact that the member 52 of the brake structure 49 is distended, and also at such time, the sprocket wheels 61 are idling due to the fact that the members 67 of the torque transmitting structures 63 are deflated, with these conditions prevailing, the operator or sawyer closes or depresses the push button switch 108 to jointly energize the solenoid coil 105 and its related solenoid coil 107, thus elevating their valve pistons 87 and 100 and thereby effecting simultaneous deflation of the member 52 and distention of the member 67 of the related torque transmitting structure 63, which deflation unlocks or releases the shaft 38 for rotation, while said distention causes the friction shoes 68 of the above mentioned structure 63 to engage the periphery of its related clutch drum 62, whereby torque is transmitted from the sprocket wheel 61 to the shaft 57, which torque in turn is transmitted thru the spur pinion 55 and spur gear 46 to the intermediate shaft 38, from which it is transmitted through the worm 37 and worm wheel 36 to the driven or set shaft 24 for imparting rectilinear motion to the sprocket chain gearing 23 to cause the knees 22 to advance the log 25 to the saw line, following which the operator releases or opens the push button switch 108 to cause instant locking of the shaft 38 and the holding of the log 25 at the selected or predetermined saw line. The opening of the switch 108 reverses the cycle of operation above described, in that the solenoid coil 105 and related coil 107 are de-energized permitting the valve springs aided by gravity to return the valve pistons 87 and 100 to their lowered positions, thus effecting simultaneous distention of the brake structure 49 and deflation of the distended torque transmitting structure 63, which deflation releases the friction shoes 68 of the latter from engagement with its clutch drum 62, thereby breaking the driving connection between the shaft 57 and its related driving sprocket 61. To return the knees 22 to a fully retracted position, to receive another log, or to reset same at any time to rectify any errors in setting, or during log turning periods, the operator closes or depresses the push button switch 109 to jointly energise the solenoid coil 105 and its related solenoid coil 107, whereupon the cycle of operation above described is repeated, except that reverse torque at a higher rate of speed is transmitted through the shaft 58, spur gears 56 and 46 to the intermediate shaft 38, with the shaft 57 idling meanwhile, thence through the worm 37, worm wheel 36 to the driven or set shaft 24 for imparting reverse rectilinear motion to the chain gearing 23 and thus effect relatively rapid retraction of the knees 22, during resetting or full retraction operations. Upon completion of a resetting or retraction operation the operator opens the switch 109 to cause instant locking of the shaft 38 and disconnection of the shaft 58 from its related torque transmitting structure 63 in the identical manner to that hereinbefore described for the shaft 57.

From the foregoing description, it will be manifest and apparent that the push button switches 108 and 109 provide an effective simplified control for the reversible speed-changing mechanism and its associated sawmill carriage set works, inasmuch as manipulation of such switches will instantly effect advancement of the log 25 for cutting operations or conversely instant retraction of the same for rectifying errors in setting.

In the alternative type of power drive and valve control illustrated in Figs. 12 to 15, inexclusive, a cable or rope drive and a manually operable fluid pressure control valve are substituted for the sprocket drive and solenoid control valves hereinbefore described for the preferred form.

The numeral 110 designates sheaves, which replace the sprocket wheels 61 and 111 designates an endless cable or rope, adapted to pass over and under one sheave, thence over and under the other sheave, from which it extends to an idler sheave 112, around which it passes to extend in the opposite direction to pass under and over a drive sheave 113, thence under and over a second idler sheave 114 to extend to a third idler sheave 115, around which it passes to extend and return to the first mentioned sheave 111. The drive sheave 113 is rigidly secured to a driving shaft 116 journalled in bearings 117 and connected with a suitable source of power, not shown, while the stub shafts 118 of the idler pulleys are journalled in bearings 119.

The numeral 120 designates the manually operable fluid pressure control valve, which replaces the solenoid valves 84 and 96, said valve 120 comprising a valve body 121; an oscillative dome-shaped valve cover or bonnet 122; a valve operating handle 123; a downwardly depending valve stem 124; a helical compression spring 125; an anti-friction thrust collar 126; and a retaining nut 127.

The valve 120, in the present instance, is a five-way valve, hence, the valve body 121 is provided with a fluid pressure inlet port 128; a fluid pressure outlet port 129 for the fluid-distensible brake structure 49a; fluid pressure outlet ports 130 for the fluid-distensible torque transmitting structures 63a; and a fluid pressure exhaust port 131. The fluid pressure inlet port 128 is connected by a pipe 92a to a suitable source of fluid pressure, not shown; the fluid pressure outlet port 129 is connected by a pipe 93a to the fluid-distensible member of the brake structure 49a, said pipe 93a having a quick-opening automatic exhaust valve 94a interposed therein; the fluid pressure outlet ports 130 are each connected by pipes 102a to the rotor seals 72a of their related torque transmitting structures 63a, said pipes 102a also having quick-opening automatic exhaust valves 94a interposed therein. The fluid pressure exhaust port 131 is provided with an exhaust pipe 132, whereby the exhaust fluid pressure is carried off and dissipated at any suitable or desirable point.

The valve body 121, at its upper end, is provided with a flat valve face, upon which all of the fluid pressure ports above described open, and seating upon said face is the oscillative dome-shaped valve cover 122 also provided with a flat valve face for such purpose, said last mentioned face having an outer semi-circular groove 133 and an inner circular groove 134 concentrically formed therein, also formed in said face in the same curvilinear plane and in diametrically opposed relation to the semi-circular groove 133 is a relatively short arcuate groove 135, which latter is connected and communicates with the inner circular groove 134, as shown more clearly in Fig. 15.

To positively maintain the oscillative valve cover 122 in seated relation upon the valve body 121, the valve stem 124, at its upper end, is threadedly secured within the cover 122 and extends downwardly therefrom through the valve body 121 and the concentrically recessed lower end 136 of the same, wherein the helical compression spring 125 is housed, which latter imposes a constant tension on said stem by reason of the fact that it abuts, at its lower end, the thrust collar 126 carried upon the lower end of the stem 124, which collar is held against downward axial dislodgement by the retaining nut 127.

The oscillative valve cover 122 upon its upper face is provided with an upwardly extending axial stub 137 to which is detachably secured, as by a set screw 138, the valve operating handle 123. To limit oscillative movement of the valve cover in relation to the body 120, said cover is provided with a lug 139, which latter at the limit of oscillative travel of the cover in either direction is adapted to abut stop lugs 140 formed upon the periphery of the body 121.

In the operation of the alternative form of valve control, with the valve operating handle 123 in its mid-position shown in full lines in Fig. 15, the brake structure 49a is distended and the torque transmitting structures 63a are deflated, for the reason that the fluid pressure inlet port 128 is in communication with the fluid pressure outlet port 129, and the fluid pressure outlet ports 130 are in communication with the fluid pressure exhaust port 131. To impart a log advancing movement to the driven or set shaft 24a, the operating handle 123 is moved to the dotted line position in Fig. 15, whereupon the brake structure 49a is deflated and the left torque transmitting structure is distended to transmit torque to the shaft 24a in the identical manner hereinbefore described for the shaft 24. Rotation of the shaft 24a may be arrested at any time by returning the operating handle 123 to its mid-position, at which time the brake structure 49a is again distended and the distended torque transmitting structure 63a deflated. To effect reverse rotation of the shaft 24a, the handle 123 is moved to the dot and dash line position in Fig. 15, at which time the brake structure is again deflated and the right torque transmitting structure 63 distended to thereby transmit reverse torque to the shaft 24a as hereinbefore set forth for the shaft 24.

In the present disclosure two driving shafts are provided for furnishing one speed forward and one speed in reverse; however, it is to be understood that additional driving shafts may be provided for furnishing or obtaining two or more forward driving speeds when necessary.

In conclusion, I desire to state that while I have herein shown and described the electrically operated valves 84 and 96 in combination with the sprocket type of drive, and the manually operable valve 120 in combination with the rope type of drive, such valve controls may be employed interchangeably with either type of drive, as found expedient.

Manifestly, therefore, the reversible speed-changing mechanism of the invention is comparatively simple in construction and operation; is easy to install; is positive and efficient in use; will not readily get out of order; and may be manufactured at a relatively low cost.

While I have herein shown and described the invention with sufficient detail to enable those skilled in the art to understand the mode of construction and the principles involved, it is to be understood that there is no intentional limitation herein to the specific forms and precise details of construction of the invention shown and described, except as expressly defined by the appended claims, and it is to be further understood that various changes and modifications of such construction may be resorted to without departing from the spirit of the invention or the benefits derivable therefrom.

What I claim as my invention, and desire to secure by Letters Patent, is:

1. The combination, in a reversible power transmission mechanism, of a reversible power out-put shaft; a worm gear fixedly secured to said shaft; a brake shaft having a worm for meshing with said worm wheel; a spur gear and a brake drum fixedly secured to said brake shaft in axially spaced relation; brake means associated with said brake drum for arresting rotation thereof; power transmission shafts disposed on each side of said brake shaft in spaced parallel relation thereto; spur gears fixedly secured to said transmission shafts for meshing with the spur gear on said brake shaft; sprocket wheels revolubly mounted upon said transmission shafts; driving means for reversely rotating said sprocket wheels; and clutch means individual to each of said sprocket wheels for selectively and drivably connecting the same to their respective power transmission shafts.

2. The combination, in a reversible speed-changing mechanism, of a reversible power out-put shaft; a worm gear fixedly secured to said shaft intermediate the length thereof; a brake shaft disposed in substantially perpendicular relation to said power out-put shaft; an integral worm carried by said brake shaft adjacent one end thereof for meshing with said worm gear; a brake drum fixedly secured to the opposite end portion of said brake shaft; a spur gear fixedly secured to the brake shaft intermediate said worm and brake drum; fluid-distensible brake means associated with said brake drum for arresting rotation thereof; power transmission shafts disposed on each side of said brake shaft in spaced parallel relation thereto; a spur gear fixedly secured to one of said transmission shafts for meshing with the spur gear of said brake shaft, whereby such interconnected shafts are driven at substantially the same speed; a spur pinion fixedly secured to the other of said transmission shafts for meshing with the spur gear of said brake shaft, whereby the latter is reversely rotated at a relatively low speed; sprocket wheels revolubly mounted upon said transmission shafts; driving means for reversely rotating said sprocket wheels; fluid-distensible clutches individual to each of said sprocket wheels for selectively and drivably connecting the same to their respective power transmission shafts; and fluid pressure supply means for said fluid-distensible brake means and said fluid-distensible clutches.

3. The combination defined in claim 2, in which the fluid pressure supply means include valve means whereby distention of the selected clutch is effected simultaneously with the deflation of said brake means and conversely distention of the latter concurrently with deflation of the distended clutch.

LIONEL PEASE.

REFERENCES CITED

The following references are of record in the file of this patent:

UNITED STATES PATENTS

| Number | Name | Date |
|---|---|---|
| 113,866 | Ferry | Apr. 18, 1871 |
| 995,205 | Trout | June 13, 1911 |
| 1,004,837 | Wright | Oct. 3, 1911 |
| 1,043,355 | Pelton | Nov. 5, 1912 |
| 1,394,448 | Sitney | Oct. 18, 1921 |
| 1,492,317 | Willette | Apr. 29, 1924 |
| 1,515,869 | Moyer | Nov. 18, 1924 |
| 1,558,649 | Thomas | Oct. 27, 1925 |
| 1,912,112 | Wunsch | May 30, 1933 |
| 2,003,351 | Eells | June 4, 1935 |
| 2,251,444 | Fawick | Aug. 5, 1941 |
| 2,386,923 | Andrus | Oct. 16, 1945 |